United States Patent
Morley et al.

[15] 3,661,092
[45] May 9, 1972

[54] TRANSPORTATION SYSTEM

[72] Inventors: Richard E. Morley, Bedford; Michael P. Greenberg, Winchester, both of Mass.

[73] Assignee: Alden-Self-Transit Systems Corporation, Bedford, Mass.

[22] Filed: Dec. 5, 1969

[21] Appl. No.: 882,422

[52] U.S. Cl. .......................................104/148 R, 246/63 R
[51] Int. Cl. ..............................................B60l 15/00
[58] Field of Search ............104/148, 88; 246/63 R, 182 AA, 246/4

[56] References Cited

UNITED STATES PATENTS 3,263,625   8/1966   Midis et al..........................104/148 R
3,307,031   2/1967   Frielinghaus et al.....................246/4

*Primary Examiner*—Arthur L. La Point
*Assistant Examiner*—George H. Libman
*Attorney*—Willis M. Ertman

[57] ABSTRACT

A transportation system has a predetermined path along which vehicles move, which path is divided into a series of discrete control areas. The vehicles move along the path in synchronism with one another under system vehicle velocity control. A supervisory control which includes a series of storage registers, including a register corresponding to each control area on the path, store signals representative of vehicle information, and those vehicle information signals are moved through the storage registers in synchronism with the movement of the vehicles along the path.

22 Claims, 10 Drawing Figures

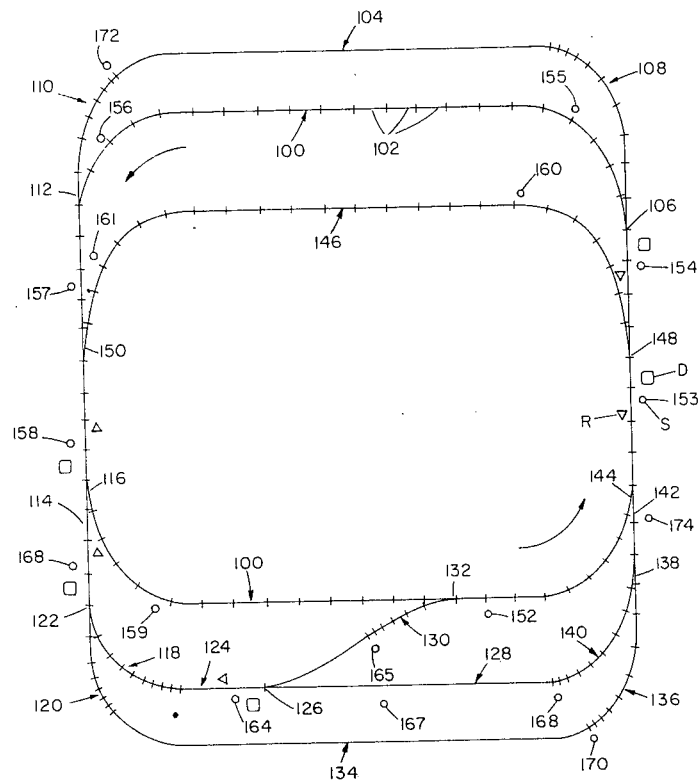

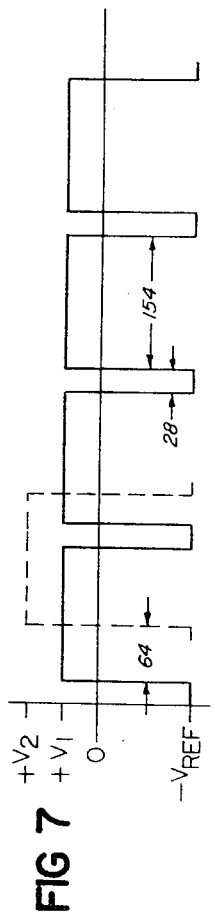
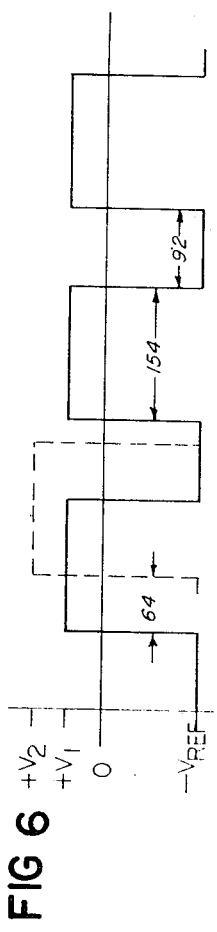
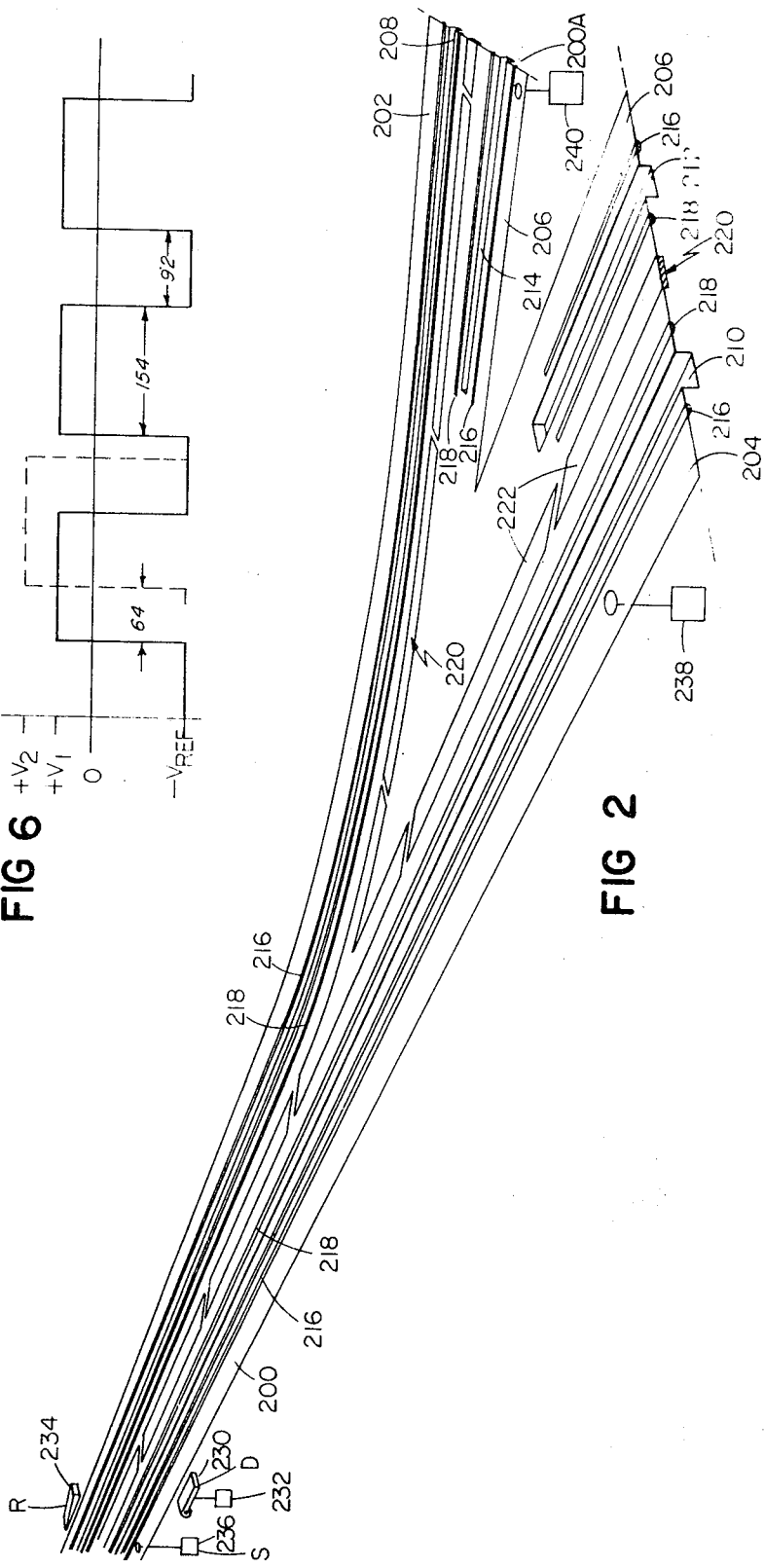
FIG 7
FIG 6
FIG 2

FIG 4
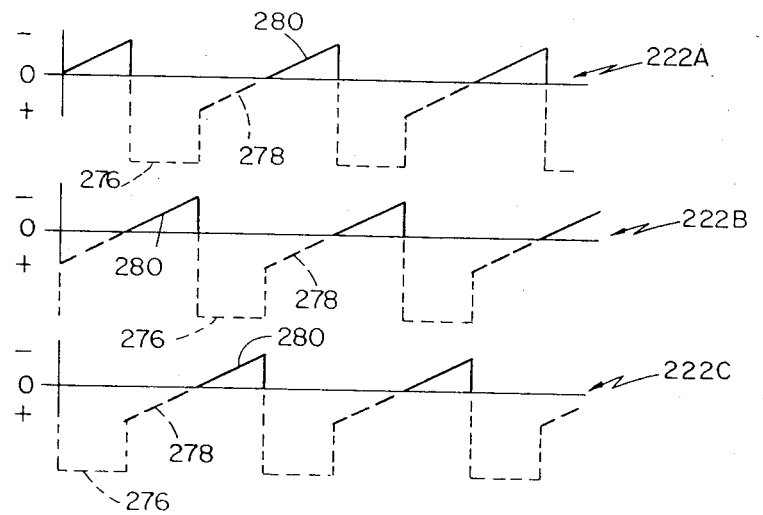
FIG 8
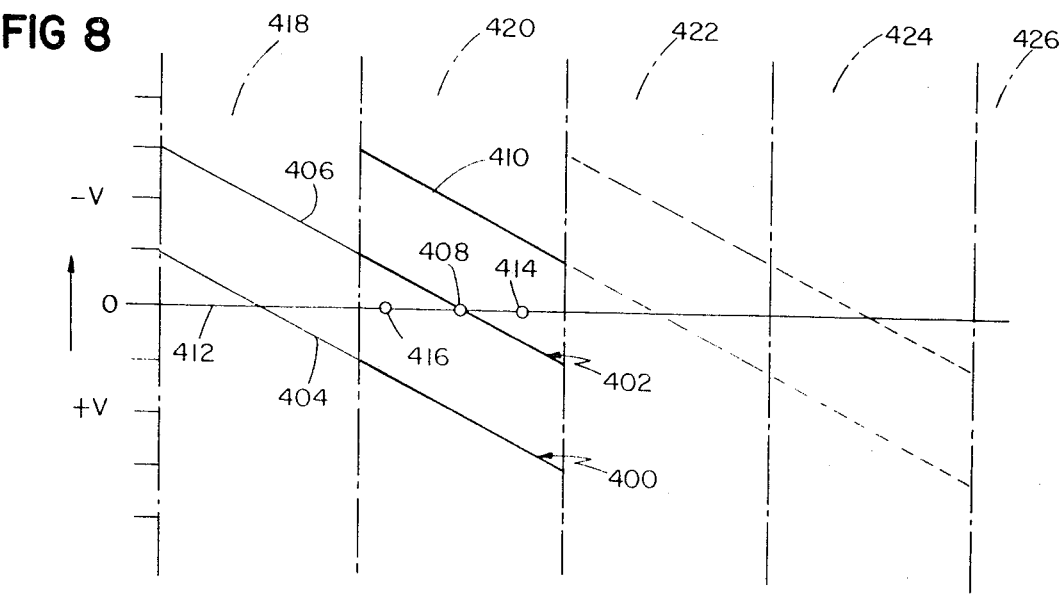
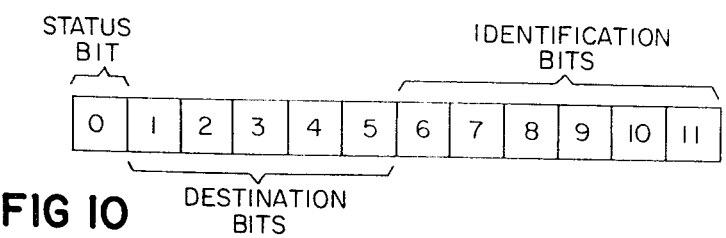
FIG 10

TRANSPORTATION SYSTEM

SUMMARY OF INVENTION

This invention relates to transportation systems and more particularly to control systems for management of vehicles on such transportation system.

Automated transportation systems are desired for a variety of purposes, including transportation of people and/or transportation of goods and materials. For example, a critical need exists for improved mass transportation systems in metropolitan areas. Baggage handling facilities at airports are overtaxed and there is increasing demand for improved transportation facilities for handling such material. Automated transportation systems, in these and other applications, offer answers to these needs. Such systems, however, must in general be flexible to handle a variety of system loads, reliable, economical, and convenient, particularly where serving the public.

The control and the coordination of the movement of vehicles on automated transportation systems involves many complex problems. Entrance and exit of the vehicles from the system must be coordinated with movement of vehicles along the system. Also, provision must be made to avoid collisions between vehicles. The system must have adequate capacity at peak times of usage to promptly direct and respond to vehicle malfunction so that the section of the system where such malfunction occurred can be cleared rapidly and other portions of the system not be unduly delayed.

Accordingly it is an object of this invention to provide novel and improved systems for the management of vehicle on a transportation system, which provides comprehensive supervision and control of the movement of vehicles in an economical, efficient and reliable manner.

Another object of the invention is to provide a novel and improved transportation control system which provides improved control of the vehicles entering and exiting from a main path of the system.

Still another object of the invention is to provide novel and improved velocity and position control for vehicles on the transportation system.

A further object of the invention is to provide novel and improved malfunction detection systems for automated transportation systems.

In accordance with one aspect of the invention, there is provided a transportation system that has a predetermined path along which the vehicles move. Means are provided for dividing the path into a series of discrete control areas and there is provided a supervisory control which includes a series of storage registers, the series of registers including a register corresponding to each control area on the path. A signal representative of a vehicle destination is stored in the storage register corresponding to the control area in which that vehicle is located. The vehicles move along the system under system control synchronously with the stepping of vehicle identification signals through the storage registers. Comparison between signal data in the storage registers and sensed vehicle location along the path provides a continuing check on the status of vehicles on the system.

The system in particular embodiments produces a series of signals that effectively define electronic slots (each slot including the definition of a preferred vehicle location point therein) that circulate continuously along the control system guideway. Each vehicle is launched by the control system from a station into a selected slot and circuitry in the vehicle senses the preferred slot point and modifies its speed to keep the vehicle within its slot. All the vehicles on the guideway are continuously under central control and travel in synchronism with a predetermined speed/spacing relationship. Overall system speed can be varied to meet changing demands or emergency conditions and vehicle speed along particular sections of the guideway can also be varied to provide higher speeds for long straight runs or slower speeds around curves, for example. The system is arranged so that the electronic slot signals at points such as junctions and station launch ramps merge with one another, and at switch points the slot signals divide with a resulting slot signal proceeding along each of the possible paths.

The series of storage registers are arranged to define an electronic map of the guideway system and its anomalies (stations, switches, junctions, sensors, power blocks and decision points) and is arranged to contain information concerning those points. Slot signals are circulated through control area registers in correspondence with the slot signals circulating through the control areas of the guideway. When a vehicle generates an entry request (for example, to a main guideway path or an alternate path) the control system checks the control area register corresponding to the entry time of the vehicle if the entry request is honored, and if that checked control area register is not occupied, a reservation is inserted for circulation in the electronic map and the system at the same time permits the vehicle to enter for ultimate junction with the selected path. At any moment of time a comprehensive, updated map is available for use in the control decision making process. When each control area register is sampled in sequence, a system of priorities can be established so that only one condition need be checked to determine whether a desired path to a destination is available and the vehicle can then be allowed to move along the entry ramp or other path without risk of collision.

System speed in particular embodiments is determined by the rate of application of command pulses to the guideway system. Speed changes are accomplished by the computer merely by varying the pulse rate. Additional pulse trains with time varying pulse rates are employed for station acceleration and deceleration ramps and may also be employed for other sections of the guideway system that have different speed requirements.

Each vehicle includes circuitry, operative after the vehicle is launched onto a control system designated slot, to sense the designated slot point and combine computer generated pulse train command information with actual vehicle position information from the guideway or other suitable apparatus to form an error signal which is applied to the vehicle's drive system. The vehicle propulsion system may take a variety of forms, for example an electric motor, or a variable displacement hydraulic pump driven by a constant speed electric motor or an internal combustion engine.

In a particular embodiment, the guideway path is divided into a series of discrete segments, each set of three segments defining a vehicle slot, two of the segments being energized for propulsion purposes and the third segment being provided for sensing purposes. System control signals are applied to the segments in a recurring manner and effectively sweep along the path to control the movement of vehicles therealong. Each segment is an electrical resistance element across which a voltage is applied to produce a ramp like actual position signal which is compared with a computer generated desired position signal of changing magnitude and the resulting difference signal is applied to the vehicle's servo-drive. A vehicle in the sensing segment of a slot will generate a failure signal, and the control system will appropriately respond. Also the system includes position verification elements at predetermined points along the guideway, such as after switch junctions, at launch ramps, etc. The control system is programmed to sense the position verification elements as a function of vehicle information signals in the storage registers and to respond appropriately to position verification error signals.

Systems constructed in accordance with the invention provide coordinated movement of vehicles without passenger control in a manner that provides continuous and comprehensive supervision; controlled entrance and exiting; and selection of alternate (short cut) paths in an efficient, flexible, reliable and economical manner. The system easily accomodates transportation systems of differing size and complexity and provides safe, rapid movement of people or goods in an automatic manner.

Other objects, features and advantages of the invention will be seen as the following description of a particular embodiment progresses, in conjunction with the drawings, in which:

FIG. 2 is a perspective view of a portion of the track (including a junction) of the transit system shown in FIG. 1;

FIG. 4 is a diagram indicating the nature of signals applied to the buses shown in FIG. 3;

FIGS. 6 and 7 are diagrammatic wave forms indicating the nature of the signals applied to the buses shown in FIG. 3;

FIG. 8 is a diagram indicating the nature of the voltage ramps generated by the system shown in FIG. 3;

FIG. 10 is a diagram indicating the format of the control word employed in the system shown in FIG. 9.

DESCRIPTION OF PARTICULAR EMBODIMENT

Figure 1:
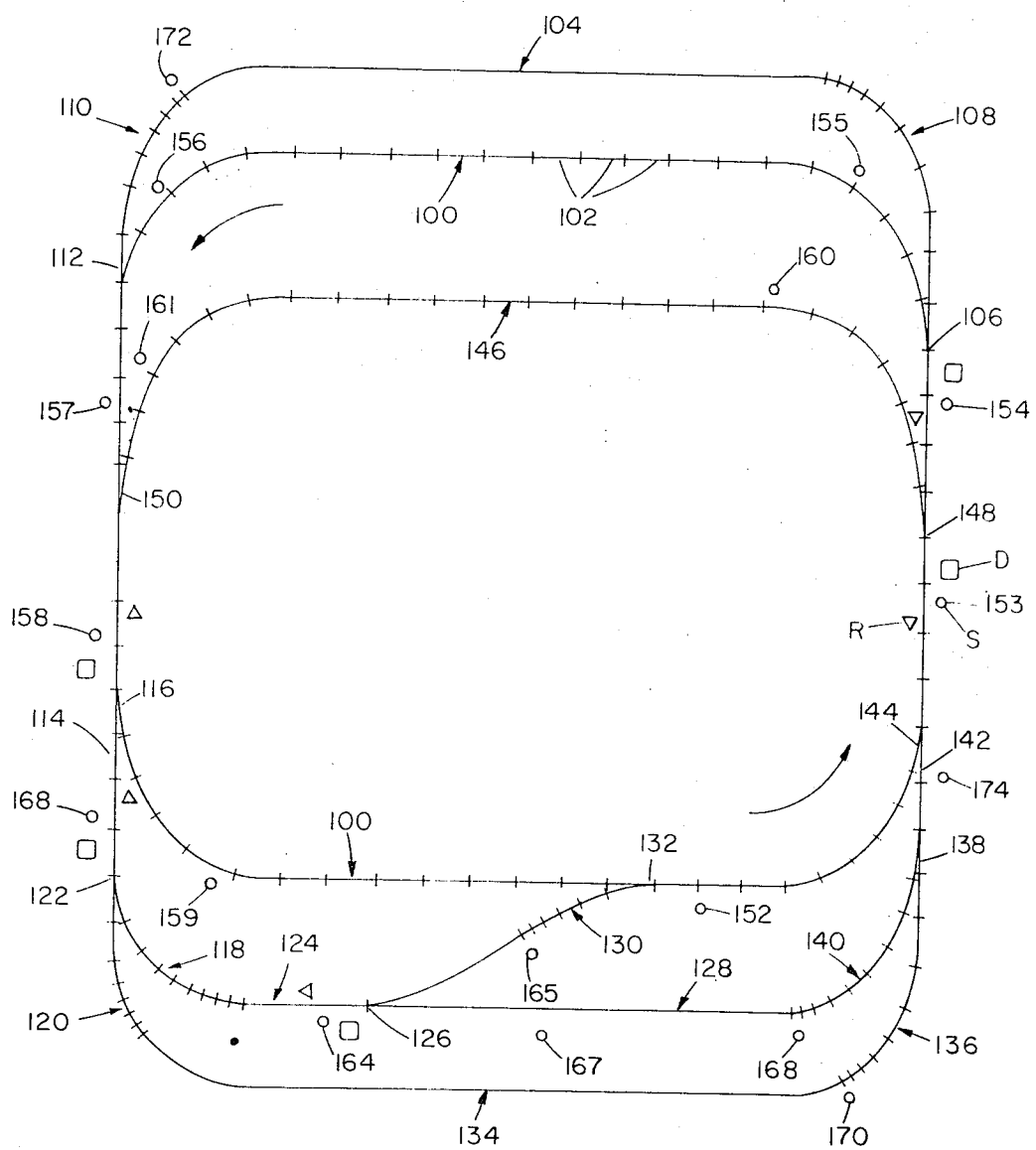
FIG. 1 is a diagrammatic view of a path of a transit system constructed in accordance with the invention.

The track layout shown in FIG. 1 includes a closed loop mainline track 100 composed of segments 102 of length as a function of relative speed at particular points on the system. For example, segments 102 or curves are shorter than at straightaways where higher speeds are permitted. The track layout also includes a station area 104 which is connected to the main track 100 via junction 106 and deceleration ramp 108 along which segments 102 decrease in length. At the exit end of the station 104 is launch ramp 110 which includes segments 102 of gradually increasing length. The launch ramp 110 merges with the main loop 100 at junction 112. A spur 114 at junction 116 connects the mainline 100 to deceleration ramp 118 from which separates a second deceleration ramp 120 at junction 122. Deceleration ramp 118 leads to a dynamic station area 124 and through that station past junction 126 to a second (static) station 128. Launch ramp 130 from station 124 joins the mainline 100 at junction 132. Deceleration ramp 120 leads to static station 134. Launch ramp 136 from station 134, at junction 138, merges with launch ramp 140 from station 128 and the common section 142 merges with the mainline 100 at junction 144. In addition, there is shown in FIG. 1 an alternate path track section 146 which leaves the main track 100 at junction 148 and merges with the main track at junction 150.

At each mainline junction is a switching system which includes a fixed reset device (designated by the letter R), a sensor (designated by the letter S) and a controlled switching device (designated by the letter D). The vehicles in this embodiment employ an invehicle switching mechanism of the type disclosed in Alden U.S. Pat. No. 3,254,608. With that mechanism, steered switching is accomplished without moving rail or track elements. The preferred path at each mainline junction is the right or exit spur and as the vehicle passes the R device the invehicle switch mechanism is checked and placed if necessary fully in the right or exit position, its normal position. Sensor S sends a vehicle present signal to the supervising computer system for vehicle verification purposes and if the vehicle is yet to exit at that junction the computer operates switching device D which triggers the invehicle switch to the left or mainline condition. In this embodiment both the R and D devices operate on the invehicle switch mechanically but other modes of operation, such as electrical switch checking and actuation may alternately or supplementarily be employed. Other sensors S are located at various points in the system, for example after junction points and at the ends of deceleration ramps, to provide vehicle presence verification.

An enlarged view of a section of track at a junction is shown in FIG. 2. As there indicated, the mainline portion of the track includes two wheel paths 200, 202, one on either side thereof. At the junction shown in FIG. 2, the spur road wheel surface 204 is an extension of surface 200 and a second road wheel surface 206 on the opposite side of the spur from surface 204 corresponds with surface 202. In the main track section there is provided a guide groove 208 which extends along the mainline. A similar guide groove 210 in the vicinity of the junction extends from the mainline onto the spur in the spur track beyond the junction to provide alternate guidances as for example at deceleration ramp 116, and a similar groove 214 is provided in the mainline beyond the junction. Power conductors 216 extend along the tracks on the outer side of each guide slot. On the inner side of each guide slot is a cooperating ground conductor 218 and at the center of the track is a motion and position control conductor 220 in the form of a series of segments 222 that have a significant electrical resistance. In this embodiment, these segments 222 correspond to track sections 102 and the segments are of graduated length along the mainline 100 at the deceleration and launching ramps. The end of each segment is formed at an angle so that a portion of it overlaps the next segment and electrical insulating material disposed in the gap between each pair of adjacent segments to provide a smooth transition. In a particular embodiment each segment 222 on the mainline 100 has a length approximately that of the vehicle and a resistance of 100 ohms per square.

As indicated above, the vehicles employed in this embodiment of the system employ an invehicle switching mechanism in which the steering mechanism is coupled to two guide followers, each of which is arranged to engage a corresponding groove 208, 210. As the vehicle moves along the main track, the right guide follower is engaged by its corresponding groove and when the vehicle approaches a junction, the guide followers may be switched so that the left guide follower is engaged with its groove and the right guide follower is disengaged. If a guide follower is in engagement with left groove 208, the vehicle stays on the mainline while if the other guide follower is in engagement with groove 210, the vehicle is switched off onto the spur.

Switching in this embodiment is controlled by the R and D structures along the track although in other embodiments switching control could be from within the vehicle. The D structure is diagrammatically indicated at 230 in the form of a ramp which is moved into switching position by a system controlled operator 232 which causes the left guide follower to engage the mainline groove 208. A fixed reset ramp (R) 234, positioned on the opposite side of the track, initially sets the switching mechanism to the spur groove 210 and if the vehicle is not to be switched onto the spur, the ramp 230 is raised to switch one follower to the guide groove 208 and then remove the other follower from groove 210. Sensors (S) are also provided adjacent the junction points, for example sensor 236 before the junction point and sensors 238 and 240 beyond the junction point in both the mainline and in the spur. These vehicle sensors may be various types of devices which are actuated and provide a signal indicative of the presence of a vehicle at that point on the track. In a particular embodiment, a reflector carried on the underbody of the vehicle reflects light from a light source in the sensor unit for sensing by a photocell in the sensor unit.

Figure 3:
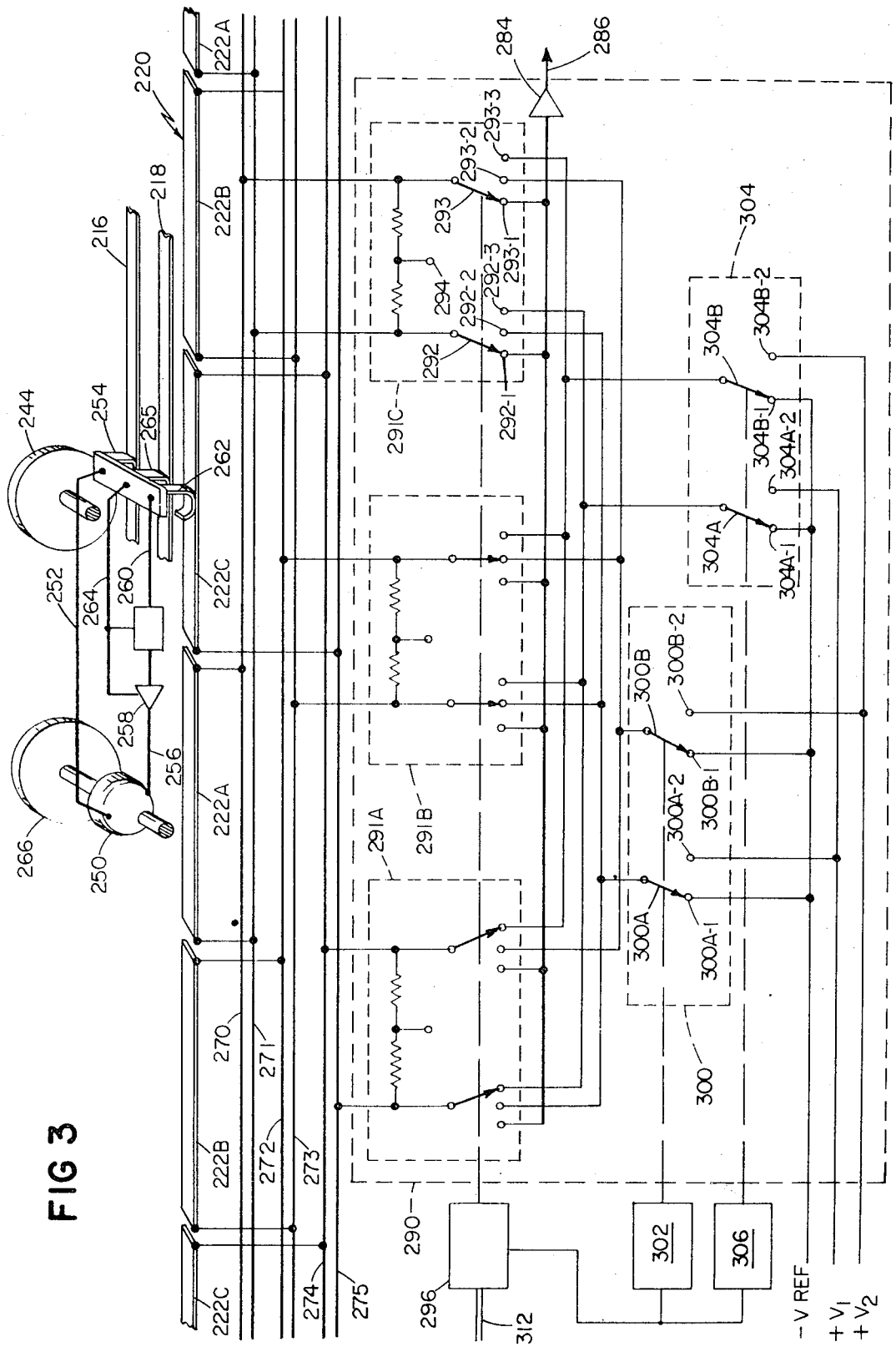
FIG. 3 is a schematic diagram of a portion of the track system, together with the components for energizing the segmented control strip to provide controlled movement of vehicles along the system.

A diagrammatic view of a vehicle employed on this transportation system is shown in FIG. 3. That vehicle includes two steerable front wheels 244 connected through steering control to the guide groove followers (not shown). A drive motor 250 has one input over power conductor 252 from the two power shoes 254 (only one being shown) that engage the power rails 216; and a second input 256 from servo amplifier 258 which in turn has a control input over line 260 from follower 262 which engages the segmented control conductor 220 and a ground connection via line 264 and the parallelled shoes 265 that engage the ground buses 218. The input to the servo compares actual track position of the vehicle with system position signals and adjusts the power input to motor 250 which drives wheels 266 to vary vehicle speed and maintain the synchronous circulation of the cars.

Three sets of control buses 270, 271, 272, 273; and 274, 275 extend along the track. The segments 222 of the control conductor 220 are arranged in groups of three. The leading edge of first segment 222A is connected to bus 270 and the trailing edge of that segment is connected to bus 271; the leading edge of segment 222B is connected to bus 272 and its trailing edge to bus 273; and the leading edge of bus 222C is connected to bus 274 and its trailing edge to bus 275. Each group of three segments 222AB&C are similarly connected in parallel to buses 270–275.

A switching network 290 is connected to three pairs of buses. The three portions of the switching network are operated in coordinated sequence to provide on each bus, signal trains as indicated in FIG. 4, that is a sense interval 276, a first control (ramp) interval 278 and a second control (ramp) interval 280. The ramp interval 280 is an extension of ramp 278. These intervals are applied sequentially in time to each pair of buses, all three intervals being applied simultaneously to all three pairs of buses in offset relation as indicated in FIG. 4. Thus when the sense signal 276 is applied to segments 222A the ramp signal 280 is applied to segments 222B and the ramp signal 278 is applied to segments 222C. In the next time slot ramp signal 278 is applied to segments 222A, sense signal 276 to segments 222B and ramp signal 280 to segments 222C.

Each ramp interval provides comparison between system desired vehicle position and actual vehicle position, and each sense interval checks for vehicle presence. With reference to FIG. 3 the system includes three switch units 291A,B,C, each of which includes two switches 292, 293. When the switches 292, 293 are in engagement with contacts 292–1 and 293–1, segments 222A are connected through amplifier 284 to sense line 286. In this switch position a voltage signal from terminal 294 is normally applied to the sense line. However, should a vehicle be on that segment when the switches 292, 293 are engaged with the first contacts, the vehicle loading on the circuit will reduce the sensed voltage, thus signalling the vehicle's presence via amplifier 284.

When the switches 292, 293 are connected to the second contacts, they apply to buses 270, 271 the ramp interval 278 which is generated by switches 300A and 300B under the control of programmer 302. As indicated schematically in FIG. 3, each switch 300 has two contacts –1, –2. In the –1 position the output lines from the switching network are both connected to a negative reference voltage $-V_{REF}$; and in the –2 position the trailing end of the segment 222 is connected to a first positive voltage ($\times V_1$) through switch contact 300A–2 while the leading end of the segment 222 is connected to a higher positive voltage ($\times V_2$) through switch contact 300B–2. Thus a voltage differential is applied across the connected resistive segment 222 in the second switch position. In the third time interval, the switches 292 and 293 are in engagement with the third terminals 292–3, 293–3 and a ramp interval 280 as a continuation of the ramp 278 is applied to the connected segments 222 under the control of programmer 306 which controls switching matrix 304 which is diagrammatically indicated in FIG. 3 as including switches 304A and 304B. Those switches have two contacts each, the first contact being connected to the same reference voltage ($-V_{REF}$) as the first contacts of switches 300A and 300B; the second contact of switch 304A connected to the lower positive voltage ($+V_1$) and the second contact of switch 304B being connected to the higher positive voltage ($+V_2$). As indicated with reference to FIGS. 3 and 4, while one switch section 291 is in engagement with its first set of contacts, the second switch section 291 associated with the next pair of buses is in engagement with its second set of switch contacts and the third switch section 291 associated with the third pair of buses is in engagement with its third set of contacts. Each segment in a group or slot of three is connected to the sense line 286 and to switch unit 300 and 304 sequentially.

System control information is supplied via the main switching control 296 to the programmers 302 and 304 in coordinated sequence to generate and apply the ramp intervals 278 and 280 to the track segments in the sequence as indicated in FIG. 4 to provide control signals which effectively sweep along the segmented paths of the system including the mainline 100 and the launch and deceleration ramps.

Figure 5:
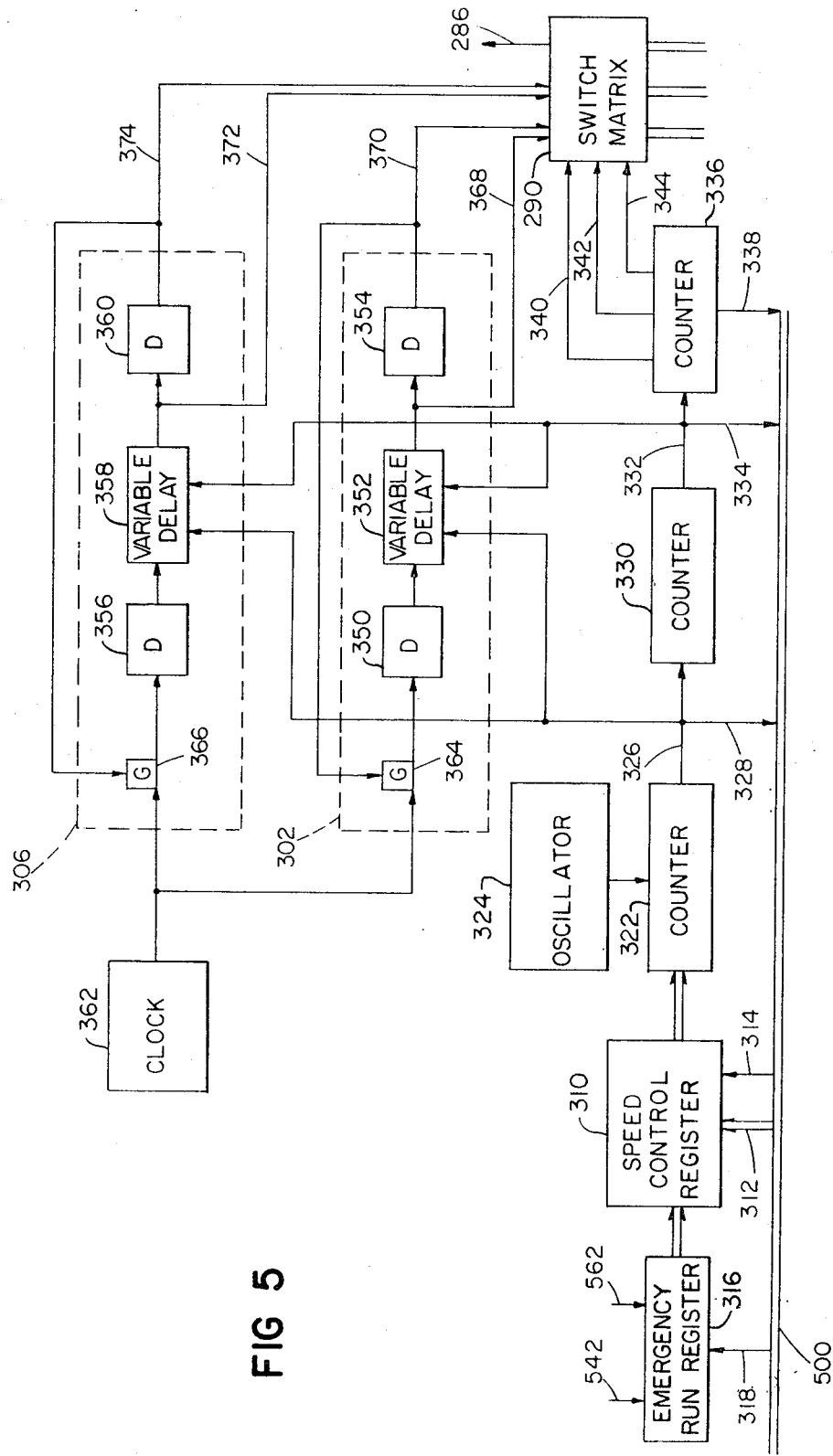
FIG. 5 is a block diagram of the system for controlling the application of signals to the buses shown in FIG. 3.

Further details of this signal generation and its control may be seen with reference to FIG. 5. The system speed is controlled by the setting of eight-stage flip flop register 310. The setting normally is determined by the supervisory system and controlled by signals applied over bus 312 from the central computer control. Upon detection of an emergency condition register 310 is cleared by a signal on line 314. Further, an emergency run speed setting in register 316, used for example to move cars slowly along the track after a malfunctioning car has been detected, is transferred to register 310 in response to a signal on line 318. The setting of register 310 is applied to counter 322 and signals from oscillator 324 at a 1.28 kHz rate in this embodiment step that counter down. An output on line 326 is produced each time counter 322 is set to zero. Thus the setting of register 310 selects the time interval between pulses on line 326. The larger the number stored in register 310, the greater the time interval between pulses on line 326 and the slower the vehicle speed on the supervised system. Each pulse on line 326 is applied to the supervisory system over line 328 and cable 500 as a control or interrupt signal (for example, to cause the supervising computer to interrogate the track sensors, e.g. the sensors 236, 238 and 240) and also to counter 330. That counter is a six-stage counter and thus produces an overflow signal on line 332 in response to 64 pulses on line 326. Each output on line 332 corresponds to one segment 222 and is applied over line 334 to the supervisory control. That signal is also applied to a second counter 336 that applies signals over lines 340, 342 and 344 for switching the outputs of the switching matrix 290 (via switch units 291) to buses 270–275. Also in response to each three pulses on line 332 the counter 336 produces an output pulse on line 338 which indicates the end of a three segment section of track.

Each programmer 302, 306 includes two fixed delay circuits and a variable delay circuit. The programmer 302 includes circuit 350 which provides a fixed 92-microsecond delay, circuit 352 which provides a delay variable between 0 and 64 microseconds, and circuit 354 which provides a fixed delay of 154 microseconds. Programmer 306 is similar in that its first delay circuit 356 provides a delay of 28 microseconds, its second delay circuit 358 provides a delay variable between zero and 64 microseconds and its third delay circuit 360 provides a fixed delay of 154 microseconds. Both programmers receive signals from clock 362 (which produces signals at a 1 Mhz rate) as controlled by gates 364 and 366, respectively. Programmer 302 provides an output on line 368 to place switches 300A, B in engagement with their second contacts, and the output on line 370 returns those switches to their first contacts. Thus voltages are applied through the second contacts of the switches 300 for a period of 154 microseconds in each cycle of programmer 302 (its duration varying between 242 and 310 microseconds). Switches 304A, B similarly engage their second terminals for a period of 154 microseconds in response to output signals on lines 372 and 374, in each cycle of programmer 306 (its duration varying between 182 and 246 microseconds). The output pulse from the last delay circuit of each programmer is also applied to gate a pulse from clock 362 to the first delay unit of the programmer, thus immediately reinitiating a cycle.

The shapes of the wave forms that are generated by programmers 302 and 306 are indicated in FIGS. 6 and 7, respectively. As there indicated, each pulse train has a positive pulse of fixed width (154 microseconds) and a negative pulse of varying width; the width of the negative portion of the pulse train produced by programmer 302 varying from 28 microseconds to 92 microseconds, and the width of the negative portion of the pulse train produced by programmer 306 varying from 92 microseconds to 156 microseconds. The increase in negative pulse width imposed by each variable delay circuit 352 and 358 is 1 microsecond in response to each output pulse of counter 322. Thus the time at which switching of switch units 300 and 304 from the −1 to the −2 contacts occurs is increased by 1 microsecond each time counter 322 produces an output, and the average value of the voltage in each complete cycle of the pulse train becomes more negative —the positive portion of each cycle being of fixed time duration and the negative portion increasing. The output of counter 330 resets both variable delay circuits 352, 358 to zero to start the sequence again, this occurring at the same time that operation of the switch units 291 occurs.

Thus in each cycle of programmers 302 and 306 there is a negative interval of varying duration in which system information is transmitted to the vehicle propulsion circuits, that is, signals which represent the desired position of the vehicle in the control area. This desired position is the same for each control area of three segments 222. Also in each programmer cycle there is a positive interval for fixed duration in which a voltage differential (ramp) is applied across the segments. The vehicle's propulsion circuits receive a different magnitude of voltage in each of these positive intervals as the vehicle moves along the segment. These positive and negative interval signals are compared and the servo 258 appropriately adjusts the motor speed to maintain the vehicle in synchronism with the moving location specified by the system information.

This system information provided during the negative interval is diagrammatically indicated in FIG. 8. In each cycle of counter 330 the average value of the voltage is gradually shifted negatively, in a series of 64 steps, so that the voltage ramps sweep along the track. In each cycle, programmer 306 causes the voltage ramp it produces to traverse from the value indicated by line 400 to the value indicated by line 402; while programmer 302 is causing its voltage ramp (in the preceeding segment) to traverse from the value indicated by line 404 to the value indicated by line 406. Switching occurs when the voltage ramp produced by programmer 306 is at the center of the segment, that is point 408, and the programmer 302 is then connected to that segment to cause the voltage ramp to traverse from that location to line 410. Programmer 306 is switched to the next segment at the same time.

Each car in a slot (control area) should be within a predetermined distance from the null point, that is the point where the ramp crosses the base line 412. The switching in a segment from programmer 306 to programmer 302 occurs when the null is in the center of the segment as indicated above. If the car at the instant of switching time is at point 414, there is a positive voltage applied to the servo circuit which causes the car to slow down while if the car at point 416 (lagging the null), a negative voltage is applied to the servo circuit to accelerate the car.

Explaining this diagram in another way, during each interval between outputs from counter 330, two ramps are generated. In the illustrated example, programmer 306 is generating a ramp in segment 420 while programmer 302 is generating a ramp in segment 418. These two ramps shift negatively synchronously and the null advances from the middle of segment 418 to the middle of segment 420. At that point, variable delays 352 and 358 are reset to zero, and switching occurs in network 290 so that the ramp from programmer 306 is applied to segment 422 and the ramp from programmer 302 is applied to segment 420. In response to the next 64 pulses from counter 322, the two ramps are again shifted negatively and the null moves from the center of segment 420 to the center of segment 422. The next output of counter 330 produces another switching operation to connect programmer 306 to segment 424 and programmer 302 to segment 422. In this interval segments 420 and and 426 are connected to the sense line 286. The null is in segment 424 and no vehicle should be in either segment 420 or 426. Programmer 306 is also connected to segment 418 and another null, in the center of that segment, controls the movement of the vehicle, if any, in that slot of three segments in the system. Thus by this repetitive switching operation, these nulls (one in each slot of three segments) are continuously moved along the track at a velocity controlled by the setting of register 310. The actual position signal provided during each positive interval is continuously sensed by the vehicle's servo circuits to provide continuous, spaced vehicle control coordinated with nulls or references that continuously traverse the vehicle path.

Figure 9:
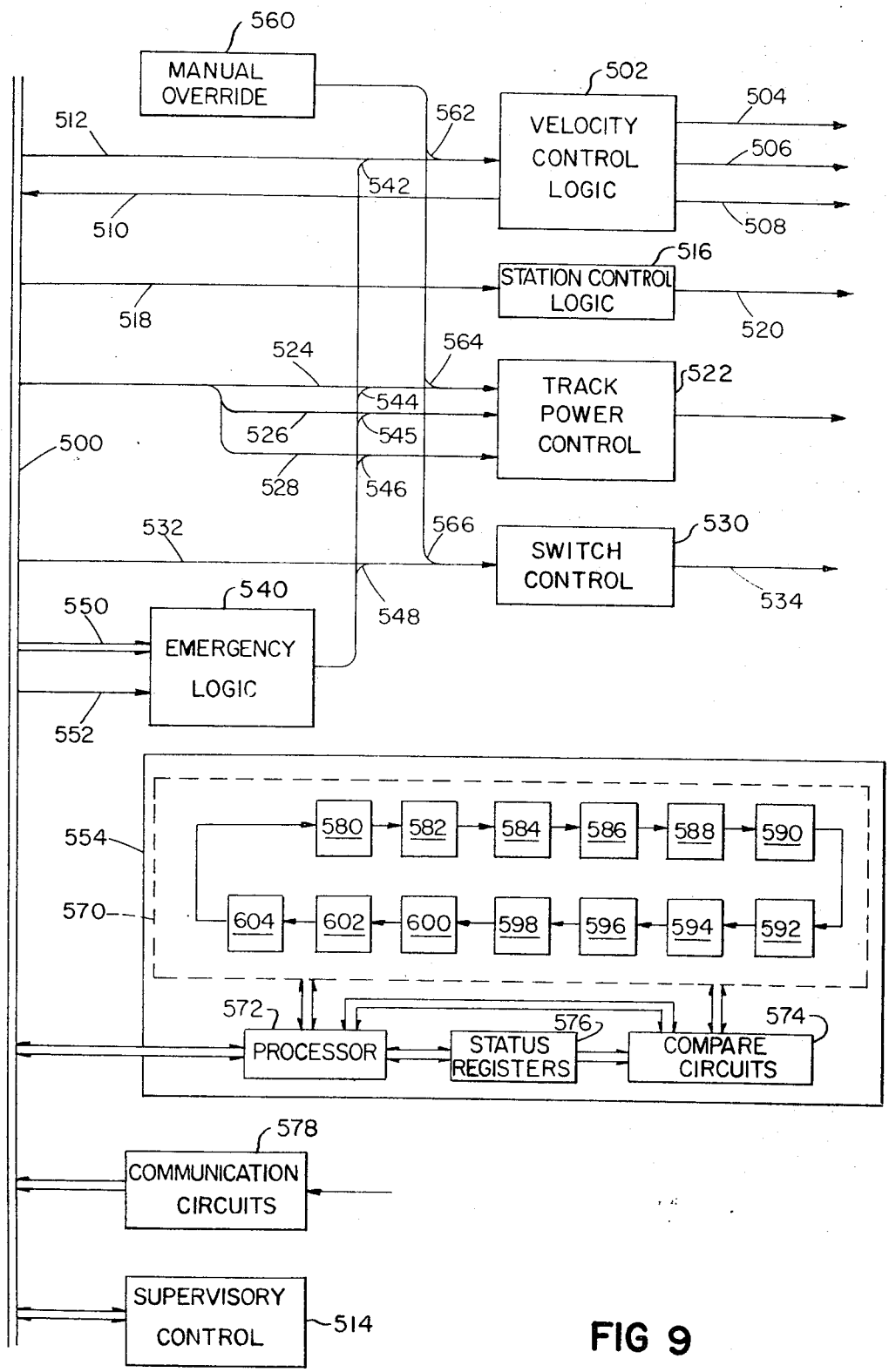
FIG. 9 is a block diagram of the overall supervisory system.

A block diagram of the transportation system control is shown in FIG. 9. That system includes a common bus 500 over which information is transmitted. The velocity control logic shown in FIG. 5, indicated by block 502, produces outputs on cables 504, 506, 508 to the track buses 270–275. In addition, status information from the sense amplifiers (lines 286), together with control information on lines 328, 334, and 338 are supplied over cable 510 to bus 500. System velocity control information is supplied over line 512 to network 502, from system supervisory control which is indicated at 514. In addition, station velocity control information is supplied to circuits 516 over bus 518 for application to stations over bus 520.

Power supplied to the track power conductors 216 is controlled through circuits 522. The system may be divided into two or more sections and power applied to each of those sections of the track individually. Thus, control signals for such individual sections are applied over line cable 524, permitting power to be removed from alternate path track section 146, for example, should a fault occur in that section while retaining power on the mainline 100. Control signals for station power are applied over lines cable 526 and control signals for launch ramp power are applied over cables 528. Energization of the switch actuators D is controlled by circuit 530 which has inputs from the IO bus 500 over cable 532 and outputs on cable 534.

Emergency circuit 540 applies signals to the velocity control network 502 over line 542; controls the application of power to sections of the track over lines 544–546; and controls the position of switches by signals on lines 548. This circuit 540 operates in response to detection of a fault condition as indicated by signals on lines 550 to isolate the fault condition and shunt cars past that point. In response to a vehicle fault condition, the emergency circuit 540 is activated to stop the vehicles. This circuit is programmed to set register 310 to zero velocity and to remove power from the track sections, the stations and their launch ramps.

The system processor 554, a PDP-8/I computer in this embodiment, receives vehicle destination instructions requests; system commands such as system speed; and inputs from the detectors on the track. This supervisor generates commands which are applied over the input output bus 500 for controlling the application of power to the track; and coordination of application of power within the stations; the speed of movement of the vehicles over the track; and control of switch elements at the junction points. An "Activity" pulse is periodically generated by the central processor 554 and if that activity pulse is not generated for a specified short interval of time, emergency control 540 is actuated to switch the system to an emergency condition in which the cars are propelled at an emergency speed (in the order of 2 miles an hour, for example); all the switches are set by emergency control 540 so that all the vehicles must exit into the first station to which they come; and launch power and station power is controlled so that vehicles are not launched into the system.

As an alternative to emergency shutdown, it may be desirable to move the vehicles along the system or a portion thereof in a system control override mode and manual control circuitry 560 is provided for this purpose. That circuitry sets velocity control register 310 in network 502 via a signal over line 562 to a value for moving the vehicle at a suitable speed, for example 5 miles per hour; applies power to the main track section over lines 564 for powering the vehicles; and sets the switches by signals over lines 566 so that the vehicles are switched off the main track into the first station to which they come so that the main track is cleared of all vehicles. When system operation is resumed with vehicles on the main track, system control 514 starts the vehicles at a low initial speed but increases that speed to the normal system speed by changing the setting of the velocity control register 310 at appropriate intervals.

Supervision of the vehicles on the system is provided by a series of groups of storage registers 570 associated with processor 554. Those groups of storage registers include registers corresponding to each track segment and each ramp segment, as well as registers which correspond to decision points on the system in correlated location with adjacent track segments. Information in storage 570 is sequenced through the storage registers and decisions are made by processor 572, a digital computer which correlates the vehicle and destination information in the storage tables with the checking of decision points as they are reached. Such checking is accomplished with the use of comparator and other equipment such as auxiliary status registers 576.

The vehicles can communicate with the system through circuits 578, a typical communication being the destination request of a particular vehicle.

The tables in storage 570 are arranged in series of registers organized according to specific portions of the transportation system as indicated in the following tabulation:

| Storage Table | Description |
| --- | --- |
| 580 | Status of deceleration ramp 120 |
| 582 | Status of deceleration ramp 118 |
| 584 | Status of deceleration ramp 108 |
| 586 | Alternate track 146 |
| 588 | Main track 100 |
| 590 | Status of Station 124 |
| 592 | Status of station 128 |
| 594 | Status of station 134 |
| 596 | Status of station 104 |
| 598 | Status of launch ramp 130 |
| 600 | Status of launch ramp 140 |
| 602 | Status of launch ramp 136 |
| 604 | Status of launch ramp 110 |

This series of groups of storage registers is arranged for sequential interrogation so that each register in the entire series of tables may be sequentially updated in each cycle concurrent with vehicle movement on the system.

Each word stored in a register contains 12 bits in the form indicated in FIG. 10. If the first (status) bit (bit 0) is a 1, the register identifies a track segment and if the first bit is 0, the register contents involve decision information, either sensors, switch points or instructions for control of the sensing and vehicle identification transfers. Bits 1–5 of each word in a track segment register contain destination information and bits 6–11 contain vehicle identification information. A "phantom" is indicated by a 1 in each of bits 6–11 (77 in octal notation).

In the control (in contrast with segment) registers, bits 1–5 identify a particular element and bits 6–11 identify the elements or conditions as indicated in the following table:

| | |
| --- | --- |
| 01 | Sensor Number in Bits 1–5 |
| 02 | Switch Decision |
| | *Deceleration Ramp |
| | *Trap Address |
| 03 | *Deceleration Ramp Address Launch |
| | *Launch Ramp Number |
| | *Launch Delay Counter Address |
| | *Phase |
| | *Number of Slots to be Checked |
| | *Slot Address |
| | *Slot Address |
| 04 | Merge |
| | *Address of Slot |
| 05 | End of Deceleration Ramp |
| | *Address of Queue Table |
| 06 | Kill Launch Ramp |
| | *Launch Ramp Number |
| 07 | *Clear Soft Sensor |
| | Open Deceleration Ramp |
| | *Deceleration Ramp Number |
| 10 | Switch Number in Bits 1—5 |
| 11 | Destination of Switch in Bits 1–5 |
| 12 | Power Start, Section in Bits 1–5 |
| 13 | Power Stop, Section in Bits 1–5 |
| 14 | Alternate Path |
| | *Station (S) Skipped by Alternate Path, Format of 11 |
| | *Address of Main Track Phantom Slot |
| | *Switch Number, Format of 10 |
| | *Address of Alternate Path Table |
| 15 | End of Track |
| | *Address for Data |
| | *Address of Next Track Table |
| 16 | Program Branch—Queues (Different Program) |
| | *Address for Data |
| | *Address of Next Program |

Thus the supervisory store 554 provides a representation of all the segments of the track system. Whenever a vehicle is on the synchronous portion of the track system, the corresponding system track segment register contains the identification of that vehicle and its destination. That information is advanced through the store in synchronism with the movement of the vehicle on the track system.

The system allows a vehicle to be launched whenever a vacant slot is detected at the projection of the launching ramp onto the main track system, as the system is arranged so that once in the main track system, the vehicle is assured of reaching its destination. When a vacant slot is detected in response to a vehicle request, it is "reserved" by inserting a reserve indication ("Phantom") in that track segment which indication merges with and is overridden by the actual vehicle identification. Once on the main path, the vehicle is moving at a system velocity in synchronism with all the other cars on the system. It will be understood that the system speed is a function of the rate at which the nulls traverse the segments and the length of the segments. Thus, speed at particular segments can be increased by lengthening those segments.

At each junction point, conditions are checked to see whether an alternate path (e.g., short cut) should be taken. Two checks are made, one to see whether the alternate path would bypass the destination of the vehicle and the other to see whether the point at which the alternate path rejoins the main path is available, the latter by checking the projection of the cutoff point of the alternate path on the main loop. If that projection point is empty, the vehicle may be switched onto the alternate path with transfer of the vehicle identification information to the alternate path and release of that slot in the main path. As the system condition is checked sequentially, only one point in the main path need be checked and if that slot is available (cell is empty) that slot is reserved so that the alternate path can be taken and at the merge point (where the alternate path rejoins the main loop) that reserved cell will merge with the vehicle.

The system supervision circuits receive destination instruction requests from the vehicles at stations via circuits 578 which are stored in corresponding registers 576. That is, each destination request is correlated with the identification of the requesting vehicle by storage in the storage register corresponding to the location of the vehicle making the request. For example, when a vehicle in station 128 requests a trip to station 104, the vehicle destination information is stored in register 0127 in storage group 576. This request is checked by register 0560 of station 128 storage 592 and the destination data is transferred to register 0560. The vehicle then is moved through the station (128 in the example) to its launch ram (140 in the example) and the vehicle identification is moved through the following registers in the storage tables 592 and 600. At the launch ramp the vehicle is controlled in accordance with the information in registers in table 600 and when a proper launch condition is obtained, the vehicle destination information is transferred through the launch table 600 to the main track table 588 in synchronism with actual movement of the vehicle for launching.

Signals from the motion generator circuits 502 are applied over lines 510 and the IO bus 500 to control the processor 572. Those signals, as discussed above, are generated in synchronism with a movement of the time division control signals along the segmented control strip of the main path 100, the alternate path 146 and the launch and deceleration ramps. At the same time the signals on output lines 504, 506 and 508 are switched, the status of the tables in storage 570 are updated, that is the vehicle identifications are moved to the next track segment storage register corresponding to the segment in which the vehicle should be located at that time. At each decision point, the vehicle and destination information in the storage registers are examined and the system conditions are interrogated to provide a basis for the decision making process by the computer. Such decisions include launching of vehicles into the mainline 100 and decisions on paths a vehicle should take dependent on their destination and the availability of alternate paths. Thus the vehicles on the track and the corresponding vehicle identifications in storage move in synchronism. While vehicles at different points on the system can be moving at different speeds, all vehicles move across any particular segment at the same speed, that speed being determined by the particular setting of the velocity control register 310.

The arrangement of these words in the registers may be better understood with reference to FIG. 1 and the following corresponding tabulation of the storage tables 570:

DECELERATION RAMP 120 (TABLE 580)

| | | | |
|---|---|---|---|
| 0200 | 4000 | DECL 2 | |
| 0201 | 4000 | | |
| 0202 | 0007 | | OPEN DECELERATION RAMP 118 |
| 0203 | 0001 | | |
| 0204 | 0007 | | OPEN DECELERATION RAMP 120 |
| 0205 | 0002 | | |
| 0206 | 4000 | | |
| 0207 | 4000 | | |
| 0210 | 4000 | | |
| 0211 | 4000 | | |
| 0212 | 4000 | | |
| 0213 | 0113 | | POWER STOPS IN SECTION 1 |
| 0214 | 0005 | | END OF DECELERATION RAMP 120 |
| 0215 | 0564 | | |
| 0216 | 4000 | | DUMMY TRACK SECTOR |
| 0217 | 0015 | | GO TO DECELERATION RAMP 118 TABLE |
| 0220 | 0222 | | |
| 0221 | 0223 | | |
| 0222 | 4000 | | DUMMY TRACK |

DECELERATION RAMP 118 (TABLE 582)

| | | | |
|---|---|---|---|
| 0223 | 4000 | DECL 1 | |
| 0224 | 4000 | | |
| 0225 | 4000 | | |
| 0226 | 4000 | | |
| 0227 | 1201 | | SENSORS 168 |
| 0230 | 0210 | | SWITCH 122 |
| 0231 | 0311 | | DESTINATION STATION 134 |
| 0232 | 0002 | | SWITCH 122 DECISION |
| 0233 | 0002 | | DECELERATION RAMP |
| 0234 | 0257 | | DUMMY TRAP |
| 0235 | 0200 | | DECELERATION RAMP 120 |
| 0236 | 4000 | | |
| 0237 | 4000 | | |
| 0240 | 0007 | | OPEN DECELERATION RAMP 118 |
| 0241 | 0001 | | |
| 0242 | 4000 | | |
| 0243 | 4000 | | |
| 0244 | 4000 | | |
| 0245 | 4000 | | |
| 0246 | 4000 | | |
| 0247 | 0113 | | POWER STOPS IN SECTION 1 |
| 0250 | 0005 | | END OF DECELERATION RAMP 118 |
| 0251 | 0506 | | |
| 0252 | 4000 | | DUMMY TRACK SECTION |
| 0253 | 0015 | | GO TO DECELERATION RAMP 3 TABLE |
| 0254 | 0256 | | |
| 0255 | 0260 | | |
| 0256 | 4000 | | DUMMY TRACK |
| 0257 | 0000 | ZERO | DUMMY TRAP |

DECELERATION RAMP 108 (TABLE 584)

| | | | |
|---|---|---|---|
| 0260 | 4000 | DECL 3 | |
| 0261 | 4000 | | |
| 0262 | 4000 | | |
| 0263 | 4000 | | |
| 0264 | 4000 | | |
| 0265 | 4000 | | |
| 0266 | 4000 | | |
| 0267 | 0007 | | OPEN DECELERATION RAMP 108 |
| 0270 | 0003 | | |
| 0271 | 4000 | | |
| 0272 | 4000 | | |
| 0273 | 4000 | | |
| 0274 | 0113 | | POWER STOPS IN SECTION 1 |
| 0275 | 0005 | | END OF DECELERATION RAMP 108 |
| 0276 | 0605 | | |
| 0277 | 4000 | | DUMMY TRACK SECTION |
| 0300 | 0015 | | GO TO MAIN TRACK TABLE |
| 0301 | 0303 | | |
| 0302 | 0347 | | |
| 0303 | 4000 | | DUMMY TRACK SECTION |

ALTERNATE PATH 156 (TABLE 586)

| | | | |
|---|---|---|---|
| 0304 | 4000 | ALTP | |
| 0304A | 4000A | | |
| 0305 | 4000 | | |
| 0306 | 4000 | | |
| 0307 | 4000 | | |
| 0310 | 4000 | | |
| 0311 | 4000 | | |
| 0312 | 1001 | | SENSOR 160 |
| 0313 | 0113 | | POWER STOPS IN SECTION 1 |
| 0314 | 0212 | | POWER STARTS IN SECTION 2 |
| 0315 | 4000 | | |
| 0316 | 4000 | | |
| 0317 | 4000 | | |
| 0320 | 4000 | | |
| 0321 | 4000 | | |
| 0322 | 4000 | | |
| 0323 | 4000 | | |
| 0324 | 4000 | | |
| 0325 | 4000 | | |
| 0326 | 4000 | | |
| 0327 | 4000 | | |
| 0330 | 4000 | | |
| 0331 | 4000 | | |
| 0332 | 4000 | | |
| 0333 | 4000 | | |
| 0334 | 1101 | | SENSOR 161 |
| 0335 | 0213 | | Power stops in section 2 |
| 0336 | 0112 | | POWER STARTS IN SECTION 1 |
| 0337 | 4000 | | |
| 0340 | 4000 | | |
| 0341 | 0004 | | MERGE WITH MAIN TRACK 100 |
| 0342 | 0445 | | |
| 0343 | 0016 | | |
| 0344 | 0346 | | |
| 0345 | 2200 | | GO UPDATE QUEUES |
| 0346 | 4000 | ALTPE | DUMMY TRACK SECTION |

MAIN TRACK 100 (TABLE 588)

| | | | |
|---|---|---|---|
| 0347 | 4000 | MTA | |
| 0350 | 4000 | | |
| 0351 | 0101 | | SENSOR 152 |
| 0352 | 4000 | | |
| 0353 | 4000 | | |
| 0354 | 4000 | | |
| 0355 | 4000 | | |
| 0356 | 4000 | | |
| 0357 | 4000 | | |
| 0360 | 4000 | ML23 | MERGE FROM LAUNCH RAMPS 136 or 140 |
| 0361 | 4000 | | |
| 0362 | 4000 | | |
| 0363 | 4000 | | |
| 0364 | 0201 | | SENSOR 153 |
| 0365 | 0014 | | ALTERNATE PATH DECISION |
| 0366 | 0211 | | STATION 104 SKIPPED |
| 0367 | 0406 | | PHANTOM SLOT—PATH 146 |
| 0370 | 0010 | | SWITCH 148 |

| | | | |
|---|---|---|---|
| 0371 | 0304 | | ALT. PATH TABLE |
| 0372 | 4000 | | |
| 0373 | 4000 | | |
| 0374 | 4000 | | |
| 0375 | 4000 | | |
| 0376 | 0301 | | SENSOR 154 |
| 0377 | 0110 | | SWITCH 106 |
| 0400 | 0211 | | DESTINATION STATION 104 |
| 0401 | 0002 | | SWITCH 106 DECISION |
| 0402 | 0003 | | DECELERATION RAMP NO. |
| 0403 | 0134 | | TRAP CIRCULATING CAR |
| 0404 | 0260 | | DECELERATION RAMP 108 |
| 0405 | 4000 | | |
| 0406 | 4000 | MAPS | PHANTOM SLOT—PATH 146 |
| 0407 | 4000 | | |
| 0410 | 4000 | | |
| 0411 | 4000 | | |
| 0412 | 0401 | | SENSOR 155 |
| 0413 | 0113 | | POWER STOPS IN SECTION 1 |
| 0414 | 0312 | | POWER STARTS IN SECTION 3 |
| 0415 | 4000 | | |
| 0416 | 4000 | | |
| 0417 | 4000 | | |
| 0420 | 4000 | | |
| 0421 | 4000 | | |
| 0422 | 4000 | | |
| 0423 | 4000 | | |
| 0424 | 4000 | | |
| 0425 | 4000 | | |
| 0426 | 4000 | ML4PS | PHANTOM SLOT FOR LAUNCH RAMP 110 |
| 0427 | 4000 | | |
| 0430 | 4000 | | |
| 0431 | 4000 | | |
| 0432 | 4000 | | |
| 0433 | 4000 | | |
| 0434 | 0501 | | SENSOR 156 |
| 0435 | 0313 | | POWER STOPS IN SECTION 3 |
| 0436 | 0112 | | POWER ARTS IN SECTION 1 |
| 0437 | 4000 | ML4 | MERGE FROM LAUNCH RAMP 110 |
| 0440 | 4000 | | |
| 0441 | 4000 | | |
| 0442 | 4000 | | |
| 0443 | 0601 | | SENSOR 157 |
| 0444 | 4000 | | |
| 0445 | 4000 | MAP | MERGE FROM ALT. PATH 146 |
| 0446 | 4000 | | |
| 0447 | 4000 | | |
| 0450 | 4000 | | |
| 0451 | 0701 | | SENSOR 158 |
| 0452 | 0310 | | SWITCH 114 |
| 0453 | 0111 | | DESTINATION STATION 124 |
| 0454 | 0411 | | DESTINATION STATION 128 |
| 0455 | 0311 | | DESTINATION STATION 134 |
| 0456 | 0002 | | SWITCH 114 DECISION |
| 0457 | 0001 | | DECELERATION RAMP NO. |
| 0460 | 0135 | | TRAP CIRCULATING CAR |
| 0461 | 0223 | | DECELERATION RAMP 118 |
| 0462 | 4000 | | |
| 0463 | 4000 | | |
| 0464 | 4000 | | |
| 0465 | 4000 | | |
| 0466 | 4000 | | |
| 0467 | 4000 | | |
| 0470 | 0801 | | SENSOR 159 |
| 0471 | 4000 | | |
| 0472 | 4000 | | |
| 0473 | 4000 | | |
| 0474 | 4000 | ML1PS | LAUNCH RAMP 130 PHANTOM SLOT |
| 0475 | 4000 | | |
| 0476 | 4000 | ML3PS | LAUNCH RAMP 140 PHANTOM SLOT |
| 0477 | 4000 | ML2PS | LAUNCH RAMP 136 PHANTOM SLOT |
| 0500 | 4000 | | |
| 0501 | 4000 | ML1 | MERGE FROM LAUNCH RAMP 130 |
| 0502 | 0015 | | END OF TABLE |
| 0503 | 0347 | | |
| 0504 | 0304 | | ALTP |
| 0505 | 4000 | | DUMMY TRACK SECTOR |

QUEUE TABLES

QUE1, STATION 124 (TABLE 590)

| | | | |
|---|---|---|---|
| 0506 | 4000 | QUE1 | |
| 0507 | 4000 | QUE1B | |
| 0510 | 1112 | | POWER STARTS IN SECTION 11 |
| 0511 | 1401 | | SENSOR 164 |
| 0512 | 0410 | | SWITCH 126 |
| 0513 | 0001 | | DESTINATION STATION 1 DYNAMIC |
| 0514 | 0133 | | ALT. MODE SWITCH |
| 0515 | 0124 | | ASSIGNED DESTINATION |
| 0516 | 0520 | | IF LAUNCH RAMP 130, QUE 2 |
| 0517 | 0533 | | IF STATION 128, QUE 3 |

QUE2, EXITING FROM STATION 124 TO LAUNCH RAMP 130

| | | | |
|---|---|---|---|
| 0520 | 4000 | QUE2 | |
| 0521 | 4000 | | |
| 0522 | 1113 | | POWER STOPS IN SECTION 11 |
| 0523 | 4000 | QUE2B | |
| 0524 | 0002 | | LAUNCH IF CLEAR TO LAUNCH |
| 0525 | 0024 | | SENSOR 165 |
| 0526 | 0034 | | SOFT SENSOR 166 |
| 0527 | 0003 | | DYNAMIC STATION |
| 0530 | 2652 | | LAUNCH DELAY CONSTANT |
| 0531 | 2656 | | LAUNCH DELAY COUNTER |
| 0532 | 0626 | | LAUNCH RAMP 130 |

QUE3, EXITING FROM STATION 124 TO STATION 128

| | | | |
|---|---|---|---|
| | | QUE3 | |
| 0533 | 4000 | QUE3B | |
| 0534 | 0006 | | IF SENSOR 166 ON, CLEAR SWITCH AND GO TO QUE 31 |
| 0535 | 0025 | | IF NOT, DO NOTHING |
| 0536 | 0004 | | |
| 0537 | 0540 | | |

QUE31, ENTERING STATION 128

| | | | |
|---|---|---|---|
| 0540 | 4000 | QUE31 | |
| 0541 | 4000 | QUE31B | |
| 0542 | 1501 | | SENSOR 167 (13 BASE 10) |
| 0543 | 1113 | | POWER STOPS IN SECTION 11 |
| 0544 | 0004 | | MERGE WITH QUE 4 |
| 0545 | 0546 | | |

QUE4, STATION 128 (TABLE 592)

| | | | |
|---|---|---|---|
| 0546 | 4000 | QUE4 | |
| 0547 | 1212 | | POWER STARTS IN SECTION 12 |
| 0550 | 4000 | | |
| 0551 | 4000 | | |
| 0552 | 1213 | | POWER STOPS IN SECTION 12 |
| 0553 | 4000 | QUE4B | |
| 0554 | 0002 | | CHECK IF CLEAR TO LAUNCH |
| 0555 | 0016 | | SENSOR 168 |
| 0556 | 0035 | | SOFT SENSOR 169 |
| 0557 | 0005 | | STATIC STATION |
| 0560 | 0127 | | RELEASE WORD |
| 0561 | 2653 | | LAUNCH DELAY CONSTANT |
| 0562 | 2657 | | LAUNCH DELAY COUNTER |
| 0563 | 0656 | | LAUNCH RAMP 140 |

QUE5, STATION 134 (TABLE 594)

| | | | |
|---|---|---|---|
| 0564 | 4000 | QUE5 | |
| 0565 | 1312 | | POWER STARTS IN SECTION 13 |
| 0566 | 4000 | | |
| 0567 | 4000 | | |
| 0570 | 4000 | | |
| 0571 | 4000 | | |
| 0572 | 4000 | | |
| 0573 | 1313 | | POWER STOPS IN SECTION 13 |
| 0574 | 4000 | QUE5B | |
| 0575 | 0002 | | CHECK IF CLEAR TO LAUNCH |
| 0576 | 0023 | | SENSOR 170 |
| 0577 | 0036 | | SOFT SENSOR 171 |
| 0600 | 0005 | | STATIC STATION |
| 0601 | 0126 | | RELEASE WORD |
| 0602 | 2654 | | LAUNCH DELAY CONSTANT |
| 0603 | 2660 | | LAUNCH DELAY COUNTER |
| 0604 | 0712 | | LAUNCH RAMP 136 |

QUE6, STATION 104 (TABLE 596)

| | | | |
|---|---|---|---|
| 0605 | 4000 | QUE6 | |
| 0606 | 1412 | | POWER STARTS IN SECTION 14 |

| | | | |
|---|---|---|---|
| 0607 | 4000 | | |
| 0610 | 4000 | | |
| 0611 | 4000 | | |
| 0612 | 4000 | | |
| 0613 | 4000 | | |
| 0614 | 1413 | | POWER STOPS IN SECTION 14 |
| 0615 | 4000 | QUE6B | |
| 0616 | 0002 | | CHECK IF CLEAR TO LAUNCH |
| 0617 | 0021 | | SENSOR 172 |
| 0620 | 0037 | | SOFT SENSOR 173 |
| 0621 | 0005 | | STATIC STATION RELEASE WORD |
| 0622 | 0125 | | LAUNCH DELAY CONSTANT |
| 0623 | 2655 | | LAUNCH DELAY COUNTER |
| 0624 | 2661 | | LAUNCH RAMP 140 |
| 0625 | 0751 | | |

LAUNCH RAMPS

LAUNCH RAMP 130 (TABLE 598)

| | | | |
|---|---|---|---|
| 0626 | 4000 | LR1 | |
| 0627 | 0003 | | LAUNCH IF SLOT IS CLEAR |
| 0630 | 0001 | | LAUNCH RAMP NUMBER |
| 0631 | 2656 | | LAUNCH DELAY COUNTER |
| 0632 | 0001 | | PHASE NUMBER |
| 0633 | 0001 | | NUMBER OF SLOTS TO CHECK |
| 0634 | 0474 | | MAIN TRACK SLOT |
| 0635 | 2112 | | POWER STARTS IN SECTION 21 |
| 0636 | 4000 | | |
| 0637 | 4000 | | |
| 0640 | 4000 | | |
| 0641 | 4000 | | |
| 0642 | 0006 | | KILL LAUNCH RAMP |
| 0643 | 0001 | | LAUNCH RAMP NUMBER |
| 0644 | 0034 | | CLEAR SOFT SENSOR 166 |
| 0645 | 2113 | | POWER STOPS IN SECTION 21 |
| 0646 | 0112 | | POWER STARTS IN SECTION 1 |
| 0647 | 4000 | | |
| 0650 | 0004 | | MERGE WITH MAIN TRACK |
| 0651 | 0501 | | |
| 0652 | 0015 | | GO TO LAUNCH RAMP 140 |
| 0653 | 0655 | | |
| 0654 | 712 | | |
| 0655 | 4000 | | DUMMY TRACK SECTION |

LAUNCH RAMP 140 (TABLE 600)

| | | | |
|---|---|---|---|
| 0656 | 4000 | LR2 | PHANTOM SLOT FOR LAUNCH RAMP 136 |
| 0657 | 0003 | | LAUNCH IF SLOTS ARE CLEAR |
| 0660 | 0002 | | LAUNCH RAMP NUMBER |
| 0661 | 2657 | | LAUNCH DELAY COUNTER |
| 0662 | 0001 | | PHASE NUMBER |
| 0663 | 0002 | | NUMBER OF SLOTS TO CHECK |
| 0664 | 0477 | | MAIN TRACK SLOT |
| 0665 | 0723 | | LAUNCH RAMP 136 SLOT |
| 0666 | 2212 | | POWER STARTS IN SECTION 22 |
| 0667 | 4000 | | |
| 0670 | 4000 | | |
| 0671 | 4000 | | |
| 0672 | 4000 | | |
| 0673 | 0006 | | KILL LAUNCH RAMP |
| 0674 | 0002 | | LAUNCH RAMP NUMBER |
| 0675 | 0035 | | CLEAR SOFT SENSOR 169 |
| 0676 | 2213 | | POWER STARTS IN SECTION |
| 0677 | 0112 | | 1 |
| 0700 | 4000 | | |
| 0701 | 4000 | | |
| 0702 | 4000 | | |
| 0703 | 4000 | | |
| 0704 | 0004 | | MERGE WITH LAUNCH RAMP 136 |
| 0705 | 0737 | | |
| 0706 | 0015 | | GO TO LAUNCH RAMP 136 |
| 0707 | 0711 | | |
| 0710 | 0751 | | |
| 0711 | 4000 | | DUMMY TRACK SECTION |

LAUNCH RAMP 136 (TABLE 602)

| | | | |
|---|---|---|---|
| 0712 | 4000 | LR3 | |
| 0713 | 0003 | | LAUNCH IF SLOTS ARE CLEAR |
| 0714 | 0003 | | LAUNCH RAMP NUMBER |
| 0715 | 2660 | | LAUNCH DELAY COUNTER |
| 0716 | 0001 | | PHASE NUMBER |
| 0717 | 0002 | | NUMBER OF SLOTS TO CHECK |
| 0720 | 0477 | | MAIN TRACK SLOT |
| 0721 | 0656 | | LAUNCH RAMP 140 SLOT |
| 0722 | 2312 | | POWER STARTS IN SECTION 23 |
| 0723 | 4000 | LL3PS | PHANTOM SLOT FOR LAUNCH RAMP 140 |
| 0724 | 4000 | | |
| 0725 | 4000 | | |
| 0726 | 4000 | | |
| 0727 | 0006 | | KILL LAUNCH RAMP |
| 0730 | 0003 | | LAUNCH RAMP NUMBER |
| 0731 | 0036 | | CLEAR SOFT SENSOR 171 |
| 0732 | 2313 | | POWER STOPS IN SECTION 23 |
| 0733 | 0112 | | POWER STARTS IN SECTION 1 |
| 0734 | 4000 | | |
| 0734A | 4000A | | |
| 0735 | 4000 | | |
| 0736 | 4000 | | |
| 0737 | 4000 | ML2 | MERGE WITH LAUNCH RAMP 140 |
| 0740 | 4000 | | |
| 0741 | 1701 | | SENSOR 174 |
| 0742 | 4000 | | |
| 0743 | 0004 | | MERGE WITH MAIN TRACK |
| 0744 | 0360 | | |
| 0745 | 0015 | | GO TO LAUNCH RAMP 110 |
| 0746 | 0750 | | |
| 0747 | 0656 | | |
| 0750 | 4000 | | DUMMY TRACK SECTION |

LAUNCH RAMP 110 (TABLE 604)

| | | | |
|---|---|---|---|
| 0751 | 4000 | LR4 | |
| 0752 | 0003 | | LAUNCH IF SLOT IS CLEAR |
| 0753 | 0004 | | LAUNCH RAMP NUMBER |
| 0754 | 2661 | | LAUNCH DELAY COUNTER |
| 0755 | 0001 | | PHASE NUMBER |
| 0756 | 0001 | | NUMBER OF SLOTS TO CHECK |
| 0757 | 0426 | | MAIN TRACK SLOT |
| 0760 | 2412 | | POWER STARTS IN SECTION 24 |
| 0761 | 4000 | | |
| 0762 | 4000 | | |
| 0763 | 4000 | | |
| 0764 | 4000 | | |
| 0765 | 0006 | | KILL LAUNCH RAMP |
| 0766 | 0004 | | LAUNCH RAMP NUMBER |
| 0767 | 0037 | | CLEAR SOFT SENSOR 173 |
| 0770 | 2413 | | POWER STOPS IN SECTION 24 |
| 0771 | 0112 | | POWER STARTS IN SECTION 1 |
| 0772 | 4000 | | |
| 0773 | 4000 | | |
| 0774 | 0004 | | MERGE WITH MAIN TRACK |
| 0775 | 0437 | | |
| 0776 | 0016 | | RETURN FROM INTERRUPT |
| 0777 | 1001 | | |
| 1000 | 3700 | | |
| 1001 | 4000 | ENDTRK | DUMMY TRACK SECTION |

As will be seen from FIG. 1, launch ramp 130 from station 124 includes 6 segments, each segment being designated in table 598 of storage 520 by the octal number 4,000. (A dummy track section (register 0655) is provided in table 598 for programming convenience.) After a vehicle identification is detected (at address 0626) in table 598, a launch control word (0003) is sensed in address 0627 which conditions a launch sequence. Register 0630 identifies the launch ramp and register 0631 identifies a control counter (auxiliary register 2656) which had been set from Queue Table 590 for Station 124. This counter provides a delay to make sure the vehicle requesting the launch is settled at the ramp. In each scan of the table the contents of register 2656 is reduced by one and correct phase (register 0632) is checked only when register 0631 contains zero. When the launch delay counter has the proper value (register 0631), the phase of the signal is checked (register 0632) to insure that a vehicle will be launched into the first power segment of the slot rather than the second power segment or the sense segment. When phase is correct, the next register (0633) is sensed and provides information as to the number of slots to be checked. At ramp 134 only one mainline slot must be checked (register 0474 identified by register 0634) and if that slot is open, a phantom (all ones) is inserted in that slot and power is applied to the launch ramp (register 0635). The vehicle is accelerated over four segments (registers 0636–0641) and when the vehicle is in the fourth section, a signal to terminate launch ramp power is generated as the vehicle is under system power, when advanced to the next segment (0647) in the next cycle and a merge condition (0650) is established, the following register (0651) identifying the location of the merge register to which the vehicle destination data is transferred, in this case register 0501 in the main track table. Soft sensor 0034, set by register 0526, is cleared as the launch has been completed. (Register 0652 provides an instruction for the next table to be interrogated, in this case table 602, the first register of which is 0712.)

With reference to FIG. 1 and main track table 588, register 0501 is the last segment register in the table and as the main track is a closed loop, the next segment register is 0347 (closed by the instruction in register 0503). After the car has passed two segments (registors 0347 and 0350) a sensor S1 (152) (register 0351) checks the merge condition by checking vehicle presence. (An emergency condition is established if the sensor does not indicate an actual vehicle at this time and emergency control circuit 540 is actuated.) Seven segments further along, there is a merge point (register 0360) from ramps 136 and 140. Three segments from that merge point the vehicle is sensed again (sensor 153–register 0364) and a decision process is initiated (register 0365) as to whether to operate switch 148 to shunt the vehicle onto the shorter alternate path 146. Alternate path 146 is available if the vehicle does not have a destination in station 104 so that the vehicle destination is checked (register 0366) by use of compare circuits 574; if the path 146 can be taken, the availability of the corresponding segment (register 0406) in the mainline 100 is checked and if that segment is not occupied by a car and thus is available, a phantom vehicle identification is placed in register 0406 and the switch 148 operated (register 0370). Finally, at register 0371 the vehicle information is transferred to register 0304 in the alternate path table 586.

Should the vehicle's destination be station 104 or the alternate path 146 not be available, the vehicle identification continues to be stepped through table 588. At the fourth segment the vehicle is again sensed (register 0376) and a switching decision (register 0401) is made as to whether the vehicle is to enter station 104 or continue on the mainline 100. Register 0402 identifies the alternate address (ramp 108). Also, the vehicle's destination bits are checked (register 0403) to see whether it is a circulating car (one without an assigned destination) and if there is a request (storage register 0134) for a car at station 104, the circulating vehicle is switched into the station (register 0403). If the car is to take the deceleration ramp 108, the appropriate switch actuator 232 is operated and at register 0404 the vehicle destination and identity bits are transferred to register 0260 in the deceleration ramp table 584.

Assuming the car continues along the main track 100, the second segment past switch 106 is the segment into which the phantom code would have been written had the alternate path been taken. In other words, register 0406 was checked at register 0367 and if no vehicle identification was then in register 0406, a phantom indication (all ones) would be placed in the register 0406 to reserve it if the car was to be switched onto the alternate path 146.

A phantom slot for cars entering from station 104 is provided at segment 0426; the main path merges with station 104 at register 0437 and with alternate path 156 at register 0445. Continuing along the main path, junction 116 controls exiting from the main path 100 to stations 124 (dynamic) or 128 (static) and parking station 134.

A fuller understanding of the operation of the system will be obtained from the following example of a car in station 104 that desires to go to station 134. In station 104 (table 596) when a car arrives it is moved under creep power, e.g., in the order of 2 miles an hour through the 7 segments of that station. The stations (queue tables) are asynchronous of the other tables and obviously additional tracks segments may be easily added in such areas. When a car at register 0615 generates a destination request, destination bits are loaded into that register, and a sequence is initiated to obtain launch clearance. The car is sensed by detector 172 (register 0617). The launch ramp 114 is closed by sensor 173 and the vehicle data bits are transferred to launch ramp 110 table 604 (register 0751) and a launch delay constant (selected from register 2661 in register group 576) is loaded into counter register 2661.

With reference to table 604, the transfer of data bits to register 0751 means that a vehicle ready for launch has requested a launch from ramp 110. The series of control instructions in registers 0752–0757 identify the launch ramp (0753); check the launch delay counter (2661) to see that it is zero (0754); check for the proper phase for launching, that is, a first power phase (0755); the number of slots to check (0756), in this case one main track slot (0426); and a check of that slot (register 0757). If that slot is clear, a phantom (all ones) is loaded into the address portion of the word in that slot (register 0426) and power is applied to the launch ramp by register 0760 in response to detection of a vehicle identification in that register. The vehicle is accelerated along the launch ramp 110 and the vehicle data bits are stepped through registers 0761 to 0764 in synchronism with the segment stepping signals (the output of counter 330). When the vehicle bits are transferred into register 0765, power is removed from launch ramp 110 as the vehicle is on system power and the control sensor 173 is cleared. At register 0774 the vehicle is in the merge segment 112 with the main track and the vehicle identification is transferred to register 0437 in the main track table 588, the phantom vehicle identification in the table 588 being changed to this car's data bits.

With reference now to table 588, at register 0443, the sensor 157 is interrogated to check for the presence of the vehicle. The vehicle identification is stepped through the slot segment storage registers past the merge point from the alternate path 146 at register 0445; and a sensor 158 at register 0451.

At registers 452–456 a switch decision is made. The destination bits are checked and if the destination bits identify stations 124, 128 or 134 the switch 114 is operated (register 0461). If a request for a car has been generated from any of these stations, the destination bits are checked at register 0460 and if it is a circulating car (destination bits = 00) the switch is also operated. As the vehicle has a destination of station 134, the switch is operated and the vehicle data bits are transferred to register 0223 in table 582.

At registers 0230–0233 another switch decision is made and the switch 122 is not operated as destination of the car is station 134. (Registers such as register 234 are included for convenience of programming and other registers such as 0304A for timing purposes, there being no corresponding segment in the track.) As the deceleration ramp 120 has been selected, the vehicle data bits are transferred to register 0200 (Table 580). At registers 202 and 204 signals are generated that indicate that the deceleration ramps 118 and 120 are again available for use, such use of that ramp by another vehicle having been prevented until cleared by signals that selected the ramp. The car decelerates and its image is transferred to Table 594 at register 0215. In Table 594 the car enters station 134 and is advanced under station power control (asynchronous with respect to main system power) to a transfer station where the passengers may leave the vehicle or an exit spur (not shown) where the vehicle may leave the system if it is a dual mode vehicle; or a parking area or a garage for maintenance depending on the arrangement of the system.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. In a transportation system having a predetermined path, a plurality of vehicles for concurrent movement along said path, means for dividing said path into a series of discrete control areas, system vehicle control means for generating a series of stepping signals, first means responsive to said stepping signals for generating vehicle drive signals for moving all the vehicles on said path along said path and supervisory control comprising a series of storage registers, said series of registers including a register corresponding to each control area on said path, means to store a set of signals representative of vehicle information in each storage register corresponding to the control area in which a vehicle is located, and second means responsive to each said stepping signal to transfer each said set of signals representative of vehicle information from the control area storage register in which those signals were stored prior to the generation of said stepping signal to the next control area storage register to supervise the synchronous movement of said vehicles along said path.

2. In a transportation system having a predetermined path along which a plurality of vehicles concurrently move, a junction and a second path connected to said predetermined path at said junction, means for dividing said path into a series of discrete control areas, system vehicle velocity control for effectively circulating control signals along said path to move all the vehicles on said path along said path in synchronism with one another, and supervisory control comprising a series of storage registers and a storage register corresponding to said junction, said series of registers including a register corresponding to each control area on said path, means to store signals representative of vehicle information in the storage register corresponding to the control area in which the vehicle is located, means coordinated with said system vehicle velocity control for moving said vehicle information signals through said storage registers in synchronism with the movement of the vehicles along said path and means coordinated with said junction for generating signals for controlling the selection of alternate paths at said junction on the basis of signals representative of vehicle destination information in said storage register corresponding to said junction.

3. In a transportation system having a predetermined path along which vehicles move, and a subsidiary path from which a vehicle may enter said predetermined path, said main and subsidiary paths being divided into a series of discrete control areas, system vehicle velocity control for moving all the vehicles on said path along said path in synchronism with one another, and supervisory control comprising a series of storage registers, said series of registers including a register corresponding to each control area on said path, means to store signals representative of vehicle information in the storage register corresponding to the control area in which the vehicle is located, means coordinated with said system vehicle velocity control for moving said vehicle information signals through said storage registers in synchronism with the movement of the vehicles along said path, means for checking the availability of a control area in said predetermined path by interrogating the storage register corresponding to said control area, means responsive to an indication of availability for placing a reservation signal in the interrogated storage register to reserve a control area in said predetermined path for the vehicle using the subsidiary path, and means for moving said reservation signal through storage registers corresponding to control areas of said predetermined path in synchronism with the movement of said vehicle along said subsidiary path.

4. In a transportation system having a predetermined path along which vehicles move, means for dividing said path into a series of discrete control areas, system vehicle velocity control for moving all the vehicles on said path along said path in synchronism with one another, and supervisory control comprising a series of storage registers, said series of registers including a register corresponding to each control area on said path, means to store signals representative of vehicle information in the storage register corresponding to the control area in which the vehicle is located, and means coordinated with said system vehicle velocity control for moving said vehicle information signals through said storage registers in synchronism with the movement of the vehicles along said path, including means for sampling all of said storage registers in sequence during each interval required for a vehicle to traverse a control area of said predetermined path.

5. In a transportation system having a predetermined path, a plurality of vehicles for concurrent movement along said path, means for dividing said path into a series of discrete control areas, system vehicle control for effectively circulating control signals along said path including means for generating vehicle drive signals for moving all the vehicles on said path in synchronism along said path and a series of stepping signals, each said stepping signal corresponding to a desired traverse of a vehicle across a control area, and supervisory control comprising a series of storage registers, said series of registers including a register corresponding to each control area on said path, means to store a set of signals representative of vehicle information in each storage register corresponding to the control area in which a vehicle is located, and means responsive to each said stepping signal to transfer each said set of signals representative of vehicle information from the control area storage register in which those signals were stored prior to the generation of said stepping signal to the next control area storage register independent of the movement of said vehicles along said path.

6. In a transportation system having a predetermined path along which vehicles move, means for dividing said path into a series of discrete control areas, means for generating system control signals for moving all the vehicles on said path along said path in synchronism with one another, means for generating actual vehicle position signals in each control area, and comparison circuitry for comparing said system control signals with said actual vehicle position signals for modifying the servo-propulsion system of said vehicles to maintain the vehicles in synchronous movement along said system, and supervisory control comprising a series of storage registers, said series of registers including a register corresponding to each control area on said path, means to store signals representative of vehicle information in the storage register corresponding to the control area in which the vehicle is located, and means coordinated with said system vehicle velocity control for moving said vehicle information signals through said storage registers in synchronism with the movement of the vehicles along said path.

7. In a transportation system having a predetermined path along which vehicles move, means for dividing said path into a series of discrete control areas, system velocity control including signal generating means for generating a series of signals that effectively define a series of electronic slots that circulate continuously along said path, for moving all the vehicles on said path along said path in synchronism with one another, and supervisory control comprising a series of storage registers, said series of registers including a register corresponding to each control area on said path, means to store signals representative of vehicle information in the storage register corresponding to the control area in which the vehicle is located, and means coordinated with said system vehicle velocity control for moving said vehicle information signals through said storage registers in synchronism with the movement of the vehicles along said path.

8. The system as claimed in claim 7 wherein said signal generating means is a pulse generator and means for changing the pulse repetition frequency of said signal generating means to change said system velocity.

9. In a transportation system having a predetermined path along which a plurality of vehicles concurrently move, means for dividing said path into a series of discrete control areas, vehicle sensing means located at predetermined positions along said path, system vehicle velocity control for effectively circulating control signals along said path to move all the vehicles on said path along said path in synchronism with one another, including means for generating vehicle drive signals and a stepping signal corresponding to each traverse of a vehicle across a control area, and supervisory control comprising a series of storage registers, said series of registers including a register corresponding to each control area on said path, means to store signals representative of vehicle information in the storage register corresponding to the control area in which the vehicle velocity control for moving said vehicle information signals through said storage registers in synchronism with the movement of the vehicles along said path and means responsive to each said stepping signal to transfer said signals representative of vehicle information from the control area storage register in which those signals were stored prior to the generation of said stepping signal to the next control area storage register and means responsive to vehicle information signals in said storage registers for interrogating said vehicle sensing means.

10. In a transportation system having a predetermined path along which vehicles move, and a subsidiary path from which a vehicle may enter said predetermined path, said main and subsidiary paths being divided into a series of discrete control areas, vehicle sensing means located at predetermined positions along said path, system vehicle velocity control for moving all the vehicles on said path along said path in synchronism with one another, and supervisory control comprising a series of storage registers, said series of registers including a register corresponding to each control area on said path, means to store signals representative of vehicle information in the storage register corresponding to the control area in which the vehicle is located, means coordinated with said system vehicle velocity control for moving said vehicle information signals through said storage registers in synchronism with the movement of the vehicles along said path, means responsive to vehicle information signals in said storage registers for interrogating said vehicle sensing means, means for checking the availability of a control area in said predetermined path by interrogating the storage register corresponding to said control area, means responsive to an indication of availability for placing a reservation signal in the interrogated storage register to reserve a control area in said predetermined path for the vehicle using the subsidiary path, and means for moving said reservation signal through storage registers corresponding to control areas of said predetermined path in synchronism with the movement of said vehicle along said subsidiary path.

11. The system as claimed in claim 10 wherein said supervisory control includes means for sampling all of said storage registers in sequence during each interval required for a vehicle to traverse a control area of said predetermined path.

12. The system as claimed in claim 11 wherein said system vehicle velocity control includes means for generating a stepping signal corresponding to each traverse of a vehicle across the control area, and said supervisory control includes means responsive to each said stepping signal to transfer said signals representative of vehicle information from the control area storage register in which those signals were stored prior to the generation of said stepping signal to the next control area storage register.

13. In a transportation system having a predetermined path along which vehicles move, pulse generating means for generating a series of pulses, conversion circuitry responsive to said series of pulses for generating signals that effectively define a series of electronic slots that circulate along said digital, means for changing the pulse repetition frequency of said pulse generating means to change the velocity of circulation of said slot signals along said path, and vehicle propulsion circuitry responsive to said slot signals for maintaining vehicle movement in synchronism with the movement of said slot signals.

14. The system as claimed in claim 13 wherein said vehicle propulsion circuitry includes means for generating actual vehicle position signals, and comparison circuitry for comparing said slot signals with said actual vehicle position signals for modifying the propulsion circuitry of said vehicle to maintain the vehicle in synchronism with said slot signals.

15. The system as claimed in claim 14 and further including electrical conductor means extending along said path and dividing said path into a series of discrete control areas, said electrical conductor being segmented and each said control area being defined by at least two adjacent segments of said conductor, each segment of said conductor having a significant electrical resistance characteristic so that ramp signals may be applied to said segments, and wherein said slot signals recurringly energize said conductor segments to cause said ramp signals to sweep along said path for controlling the movement of vehicles along said path.

16. In a transportation system having a predetermined path along which vehicles move, pulse generating means for generating a series of pulses, conversion circuitry responsive to said series of pulses for generating signals that effectively define a series of electronic slots that circulate along said path, means for changing the pulse repetition frequency of said pulse generating means to change the velocity of circulation of said slot signals along said path, vehicle propulsion circuitry responsive to said slot signals for maintaining vehicle movement in synchronism with the movement of said slot signals and supervisory control comprising a series of storage registers, said series of registers including a register corresponding to each control area on said path, means to store signals representative of vehicle information in the storage register corresponding to the control area in which the vehicle is located, and means coordinated with said system vehicle velocity control for moving said vehicle information signals through said storage registers in synchronism with the movement of the vehicles along said path.

17. The system as claimed in claim 16 wherein said path has a junction, a storage register in said supervisory control corresponding to said junction, and means coordinated with said junction for generating signals for controlling the selection of alternate paths at said junction on the basis of signals representative of vehicle destination information in said storage register corresponding to said junction.

18. The system as claimed in claim 17 wherein a subsidiary path is provided from which a vehicle may enter said predetermined path, said subsidiary path being divided into a series of discrete control areas, and said supervisory control includes means for checking the availability of a control area in said predetermined path by interrogating the storage register corresponding to said control area, means responsive to an indication of availability for placing a reservation signal in the interrogated storage register to reserve a control area in said predetermined path for the vehicle using the subsidiary path, means for moving said reservation signal through storage registers corresponding to control areas of said predetermined path in synchronism with the movement of said vehicle along said subsidiary path.

19. The system as claimed in claim 18 and further including vehicle sensing means located at predetermined positions along said path and means responsive to vehicle information signals in said storage registers for interrogating said vehicle sensing means.

20. The system as claimed in claim 19 wherein said system vehicle velocity control includes means for generating a stepping signal corresponding to each traverse of a vehicle across the control area, and said supervisory control includes means responsive to each said stepping signal to transfer said signals representative of vehicle information from the control area storage register in which those signals were stored prior to the generation of said stepping signal to the next control area storage register.

21. The system as claimed in claim 20 wherein said supervisory control includes means for sampling all of said storage registers in sequence during each interval required for a vehicle to traverse a control area of said predetermined path.

22. The system as claimed in claim 21 wherein path dividing means includes a segmented electrical conductor, each said control area is defined by at least two adjacent segments of said conductor, each segment of said conductor has a significant electrical characteristic so that ramp signals may be applied to said segments, and wherein said slot signals recurringly energize said conductor segments to cause said ramp signals to sweep along said path for controlling the movement of vehicles along said path.

* * * * *